No. 738,227.	Patented September 8, 1903.

UNITED STATES PATENT OFFICE.

OSCAR NASTVOGEL, OF ELBERFELD, GERMANY, ASSIGNOR TO FARBENFABRIKEN OF ELBERFELD CO., OF NEW YORK, N. Y., A CORPORATION OF NEW YORK.

RED DYE.

SPECIFICATION forming part of Letters Patent No. 738,227, dated September 8, 1903.

Application filed April 14, 1903. Serial No. 152,611. (Specimens.)

*To all whom it may concern:*

Be it known that I, OSCAR NASTVOGEL, doctor of philosophy, chemist, (assignor to the FARBENFABRIKEN OF ELBERFELD CO. of New York,) residing at Elberfeld, Germany, have invented a new and useful Improvement in Red Dyes; and I hereby declare the following to be a clear and exact description of my invention.

My invention relates to the production of new and valuable dyestuffs, being salts of bases having the following general formula:

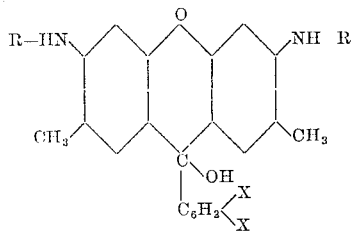

X meaning hydrogen atoms, which can be once or twice substituted by halogens, methyl or amido groups, R meaning an alkyl radical, such as methyl, ethyl, or the like.

The process for preparing the new coloring-matters consists in, first, condensing one molecule of benzaldehyde or one molecule of the above-mentioned derivatives of benzaldehyde with two molecules of o-monoalkyl-amido-p-cresol having the formula:

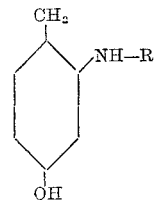

R meaning the alkyl radical; secondly, splitting off water from the resulting triphenylmethane compound, and, finally, oxidizing the pyrone thus produced to the dyestuff. The new coloring-matters thus obtained being salts of the dye bases with acids are when dry and pulverized from red to reddish-brown powders soluble in water and in alcohol with a red color, the alcoholic solutions showing fluorescence. They dye cotton mordanted with tannin, silk, or wool red shades.

In carrying out my invention practically I can proceed as follows, the parts being by weight: A mixture of fourteen parts of o-chlorobenzaldehyde, 37.2 parts of the sulfate of o-methylamido-p-cresol, and five hundred parts of a fifty-per-cent. alcohol is heated on the water-bath until on testing unchanged chlorobenzaldehyde can no longer be found to be contained in the mixture. The scarcely-soluble sulfate of the new triphenylmethane base thus prepared representing colorless needles is filtered off from the cold mixture, washed with water, and dried. It is then dissolved in two hundred and forty parts of an eighty-seven-per-cent. sulfuric acid, and the resulting solution is heated to 100° centigrade until the reaction product will become insoluble in caustic-soda lye. When this point is reached, the pyrone is precipitated by the addition of an access of alkali. For the oxidation the crystalline mass thus obtained is dissolved in one thousand parts of a five-per-cent. hydrochloric acid, and the solution thus produced is heated to the boil after the addition of one hundred parts of common salt and such a sufficient quantity of ferric chlorid until an increase of the dyestuff can no longer be observed by the further addition of ferric chlorid.

It may be remarked that the hydrochlorids of the above-defined dyestuff bases can be employed for dyeing; but the other soluble salts or even the free bases themselves may also be used.

When dry and pulverized, the new dyestuff having the following formula

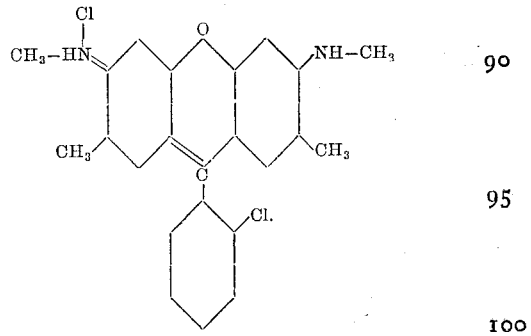

is a reddish-brown powder soluble in water and in alcohol with a red color having a yellow fluorescence, being soluble in concentrated sulfuric acid of 66° Baumé with a yellow color, a red body being obtained therefrom by the addition of ice. It dyes cotton mordanted with tannin, wool, and silk red shades.

Very similar results are obtained if instead of the starting materials used in the above example other of the above-mentioned products are used.

Having now described my invention and in what manner the same is to be performed, what I claim as new, and desire to secure by Letters Patent, is—

1. The herein-described new dyestuffs, being salts of bases having the above-given general formula hereinbefore described, being, when dry and pulverized, from red to brown powders soluble in water and in alcohol with a red color, the alcoholic solutions showing fluorescence; and dyeing cotton mordanted with tannin, wool and silk red shades, substantially as described.

2. The herein-described new dyestuff having, in the shape of the hydrochlorid, the above-given formula, which dyestuff is, when dry and pulverized, a reddish-brown powder soluble in water and in alcohol with a red color showing a yellow fluorescence; being soluble in concentrated sulfuric acid of 66° Baumé with a yellow color, a red body being precipitated therefrom by the addition of ice; and dyeing cotton mordanted with tannin, wool and silk red shades, substantially as described.

In testimony whereof I have signed my name in the presence of two subscribing witnesses.

OSCAR NASTVOGEL.

Witnesses:
OTTO KÖNIG,
JOSEPH LANGE.